US012768975B2

(12) United States Patent
Eber et al.

(10) Patent No.: US 12,768,975 B2
(45) Date of Patent: Oct. 20, 2026

(54) POWER AND TRAFFIC OPTIMIZED METHODS OF OPERATING RF ACCESS SYSTEMS

(71) Applicant: NXP B.V., Eindhoven (NL)

(72) Inventors: Wolfgang Eber, Graz (AT); Dorian Haslinger, Nestelbach bei Graz (AT)

(73) Assignee: NXP B.V., Eindhoven (NL)

( * ) Notice: Subject to any disclaimer, the term of this patent is extended or adjusted under 35 U.S.C. 154(b) by 150 days.

(21) Appl. No.: 18/491,430

(22) Filed: Oct. 20, 2023

(65) Prior Publication Data

US 2024/0176006 A1 May 30, 2024

(30) Foreign Application Priority Data

Nov. 28, 2022 (EP) .................................... 22209882

(51) Int. Cl.
*G06K 7/10* (2006.01)
*G01S 13/42* (2006.01)
*G07C 9/00* (2020.01)

(52) U.S. Cl.
CPC .......... *G01S 13/42* (2013.01); *G07C 9/00309* (2013.01); *G07C 2209/63* (2013.01)

(58) Field of Classification Search
CPC ..... G01S 13/42; G01S 13/62; G07C 9/00309; G07C 2209/63; H04W 4/80; H04W 12/06; B60R 25/246
See application file for complete search history.

(56) References Cited

U.S. PATENT DOCUMENTS

| | | | | |
|---|---|---|---|---|
| 8,618,976 | B2 | 12/2013 | Paglieroni et al. | |
| 8,674,871 | B2 | 3/2014 | Denis et al. | |
| 2019/0135299 | A1 * | 5/2019 | Glas .................. | B60W 50/0098 |
| 2019/0212434 | A1 | 7/2019 | Ding et al. | |
| 2022/0001836 | A1 | 1/2022 | Baek et al. | |

(Continued)

FOREIGN PATENT DOCUMENTS

| | | | |
|---|---|---|---|
| CN | 108024329 | A | 5/2018 |
| JP | 2009539272 | A | 11/2009 |

OTHER PUBLICATIONS

Brahmi, Imane Horiya et al., “A Fuzzy Logic Approach for Improving the Tracking Accuracy in Indoor Localisation Applications”, 2018 Wireless Days (WD), Apr. 3, 2018, pp. 137-144.

*Primary Examiner* — Vernal U Brown

(57) ABSTRACT

Systems and methods of operating an RF access system includes an anchor at a predetermined location and configured to communicate with one or more key devices. The system may perform a method that includes operating the anchor in a first mode. The first mode includes first RF ranging operations for determining a first ranging result for the anchor relative to a key device and includes determining whether the first ranging result fulfils a predetermined condition. When the first ranging result fulfils the condition, the method includes operating the anchor in a second mode including second RF ranging operations for determining a second ranging result between the anchor and the key device and including radar operations for determining a radar result for the anchor relative to a holder of the key device. The method includes determining position information associated with the key device based on the second ranging and radar results.

19 Claims, 3 Drawing Sheets

(56) References Cited

U.S. PATENT DOCUMENTS

| | | | | |
|---|---|---|---|---|
| 2023/0156429 | A1* | 5/2023 | Tertinek ................ | H04W 4/025 |
| | | | | 455/456.1 |
| 2024/0255605 | A1* | 8/2024 | Sanji ..................... | G01S 5/0295 |

* cited by examiner

POWER AND TRAFFIC OPTIMIZED METHODS OF OPERATING RF ACCESS SYSTEMS

CROSS-REFERENCE TO RELATED APPLICATIONS

This application claims the priority under 35 U.S.C. § 119 of European Patent application no. 22209882.4, filed on 28 Nov. 2022, the contents of which are incorporated by reference herein.

TECHNICAL FIELD

The present disclosure relates to the field of RF access systems, such as UWB access systems. More specifically, the present disclosure relates to a method of operating an RF access system, the system comprising an anchor arranged at a predetermined location and configured to communicate with one or more key devices. Furthermore, the present disclosure relates to a method of operating an RF access system, the system comprising a plurality of anchors, each anchor being arranged at a respective predetermined location and configured to communicate with one or more key devices. Still further, the present disclosure relates to RF access systems capable of operating in accordance with the methods.

ART BACKGROUND

Various smart access systems that utilize RF, in particular UWB ranging techniques to locate a key device are known in the art. For example, such systems are used to allow access to buildings, vehicles, public transportation facilities, etc. Some RF access systems, in particular access systems for buildings, utilize a single anchor to determine whether a key device, such as a smart phone or a fob, is within a certain range of the anchor. Other RF access systems, such as vehicle or car access systems, utilize several anchors to cover a larger spatial region and to determine the actual position of the key device, e.g., by means of so-called multilateration.

Common to all these systems is that reflections from walls or other objects may make it difficult to obtain precise ranging results, in particular in combination with signal attenuation caused by persons (such as a person carrying the key device in his/her pocket) or other objects located between the anchor(s) and the key device. Furthermore, it is generally desirable to limit the amount of traffic, in particular UWB traffic, in order to accommodate legal requirements in certain countries, such as in the USA, and to reduce power consumption. The latter is particularly relevant for access systems with multiple anchors, such as a car access system with a number of anchors arranged at various parts (e.g., corners) of a car, as the key device will usually only be within the immediate field of view of one or two of the anchors. Thus, the traffic created by the other anchors will not contribute positively to the access process but merely cause excessive traffic and power consumption.

There may thus be a need for improved concepts for operating RF access systems, in particular UWB access systems, such that precise localization can be obtained while irrelevant traffic and power consumption is reduced or even avoided.

SUMMARY

This need may be met by the subject matter according to the independent claims. Advantageous embodiments of the present disclosure are set forth in the dependent claims.

According to a first aspect, there is provided a method of operating an RF access system, such as a UWB access system, the system comprising an anchor arranged at a predetermined location and configured to communicate with one or more key devices. The method comprises: operating the anchor in a first mode, the first mode comprising first RF ranging operations for determining a first ranging result for the anchor relative to a key device; determining whether the first ranging result fulfils a predetermined condition; if the first ranging result fulfils the predetermined condition, operating the anchor in a second mode, the second mode comprising second RF ranging operations for determining a second ranging result for the anchor relative to the key device, and RF radar operations for determining a radar result for the anchor relative to a holder of the key device; and determining position information associated with the key device based on the second ranging result and the radar result.

This aspect is based on the idea that the anchor is switched from operating in a first mode comprising first RF ranging operations, such as first UWB ranging operations, to a second mode comprising second RF ranging operations, such as second UWB ranging operations, and RF radar operations, such as UWB radar operations, if the first ranging result obtained while operating in the first mode fulfills a predetermined condition. Thereby, when operating the anchor in the second mode, in addition to obtaining a (second) ranging result for the anchor relative to the key device also a radar result for the anchor relative to a holder of the key device is obtained. By utilizing the additional radar result in combination with the second ranging result to determine the position information associated with the key device, more precise position information can be obtained quicker and thereby more efficiently in terms of traffic and power consumption as compared to only utilizing the first ranging result.

In the present context, the term "RF ranging operations" may denote RF communication, such as UWB (ultra-wideband) communication, between the anchor and the key device, in particular exchange of a number of messages or data packets (with or without payload), in order to determine corresponding travel times or times of flight, in particular by recording a number of time stamps.

In the present context, the term "RF radar operations" may denote transmittal of RF signals (in particular pulse sequences), such as UWB signals, from the anchor and reception of corresponding reflections at the anchor.

As mentioned above, UWB communication may be a preferred choice. However, other RF communication channels, such as Bluetooth, Wi-Fi, 6G, etc. may also be utilized.

According to an embodiment, the first ranging result comprises a first plurality of distance estimates, each distance estimate being indicative of an estimated distance between the anchor and the key device.

According to a further embodiment, the second ranging result comprises a second plurality of distance estimates, each distance estimate being indicative of an estimated distance between the anchor and the key device.

In other words, each of the first and second ranging results may comprise a respective (first and second) plurality of distance estimates. Each of the first and second pluralities of distance estimates may be obtained during a certain (first and second) period of time. Alternatively, each of the first and second pluralities of distance estimates may contain a predetermined (first and second number) of distance estimates.

According to a further embodiment, the predetermined condition is fulfilled when the distance estimates of the first ranging result comprise a variance exceeding a predetermined variance threshold value.

In other words, the predetermined condition is fulfilled if the first plurality of distance estimates deviate from each other to a certain degree, indicating that the first ranging result is not particularly reliable.

According to a further embodiment, the second ranging result further comprises a plurality of angle estimates, each angle estimate being indicative of an angle between the anchor and the key device.

Each of the angle estimates indicates a corresponding direction towards the key device "as seen" from the anchor.

According to a further embodiment, the radar result comprises a plurality of position estimates indicative of a position of the holder of the key device relative to the anchor.

Each position estimate may in particular comprise a set of coordinates corresponding to the position of the holder of the key device (preferably in two dimensions, alternatively in three dimensions). The coordinates may be cartesian coordinates or polar coordinates.

According to a further embodiment, determining the position information comprises: identifying at least one of one or more distance estimates and one or more angle estimates from the second ranging result, and one or more position estimates from the radar result that match each other; and determining the position information based on the identified matching distance estimates, angle estimates and position estimates.

In other words, one or more distance estimates and/or one or more angle estimates (from the second ranging result) and one or more position estimates (from the radar result) that match together (in the sense that they all match one position, preferably with some uncertainty) are identified and used to determine the position information.

Thereby, by identifying a subset of matching estimates and relying on this subset for determining the position information, other estimates (e.g., corresponding to multipath reflections) are disregarded, which allows for a quicker and more precise determination of the position information.

According to a further embodiment, the position information comprises at least one parameter value selected from the group consisting of absolute position, relative position, velocity of movement, and direction of movement.

Knowledge of either of these parameter values can be used by the RF access system in various useful ways. The absolute or relative position may in particular be useful for determining whether to grant access or for initiating further requirements for granting access, e.g., when the determined position is very close to the anchor. The velocity of movement may be useful in predicting when the key device will be close enough to the anchor to grant access or initiate further requirements. The direction of movement may be useful in determining whether the key device is approaching the anchor or not. If this is not the case, the system may assume that the key device is passing by and then abort the ranging operations.

According to a further embodiment, the method further comprises operating the anchor in an initial mode in order to establish communication with the key device via another communication channel prior to operating the anchor in the first mode.

In other words, the initial contact between the anchor and the key device is not established via the communication channel that is used for ranging and radar operations, such as a UWB channel, but preferably via another RF communication channel, such as Bluetooth, Wi-Fi, 6G, etc. Thereby, when UWB is used for ranging and radar, the amount of UWB traffic is reduced, as is the corresponding power consumption.

According to a second aspect, there is provided a method of operating an RF access system, such as a UWB access system, the system comprising a plurality of anchors, each anchor being arranged at a respective predetermined location and configured to communicate with one or more key devices. The method comprises: operating each of the anchors in a first mode, the first mode comprising first RF ranging operations for determining a respective first ranging result for each anchor relative to a key device; evaluating the first ranging results to determine a subset of the anchors that fulfill one or more predetermined conditions; operating each anchor of the subset in a second mode, the second mode comprising second RF ranging operations for determining a respective second ranging result for each anchor of the subset relative to the key device, and RF radar operations for determining a respective radar result for each anchor of the subset relative to a holder of the key device; and determining position information associated with the key device based on the second ranging result and the radar result of each anchor of the subset.

This aspect is essentially based on the same idea as the first aspect discussed above in the sense that those anchors (i.e., a subset comprising one or more of a plurality of anchors) that provide a first ranging result that fulfills at least one predetermined condition are switched from operating in a first mode comprising first RF ranging operations, such as first UWB ranging operations, to operating in a second mode comprising second RF ranging operations, such as second UWB ranging operations, and RF radar operations, such as UWB radar operations. Thereby, when operating the anchor (s) of the subset in the second mode, in addition to obtaining a (second) ranging result for each anchor in the subset relative to the key device also a radar result is obtained for each anchor relative to a holder of the key device. By utilizing the additional radar result(s) in combination with the second ranging result(s) to determine the position information associated with the key device, more precise position information can be obtained quicker and thereby more efficiently in terms of traffic and power consumption as compared to only utilizing the first ranging results.

Like above, the term "RF ranging operations" may in the present context denote RF communication, such as UWB (ultra-wideband) communication, between the anchor and the key device, in particular exchange of a number of messages or data packets (with or without payload), in order to determine corresponding travel times, in particular by recording a number of time stamps.

Furthermore, the term "RF radar operations" may in the present context denote transmittal of RF signals (in particular pulse sequences), such as UWB signals, from the anchor and reception of corresponding reflections at the anchor.

As mentioned above, UWB communication may be a preferred choice. However, other RF communication channels, such as Bluetooth, Wi-Fi, 6G, etc. may also be utilized.

According to a further embodiment, the method further comprises operating the anchors that are not a member of the subset in a standby mode.

In other words, the anchors that do not provide first ranging results that fulfill the one or more predetermined conditions are switched to a standby mode. This prevents unnecessary RF traffic, e.g., in the UWB band, and contributes to reduce the overall power consumption.

According to a further embodiment, the position information comprises at least one parameter value selected from the group consisting of absolute position, relative position, velocity of movement, and direction of movement.

Like above, knowledge of either of these parameter values can be used by the UWB access system in various useful ways. The absolute or relative position may in particular be useful for determining whether to grant access or for initiating further requirements for granting access, e.g., when the determined position is very close to the anchor(s). The velocity of movement may be useful in predicting when the key device will be close enough to the anchor to grant access or initiate further requirements. The direction of movement may be useful in determining whether the key device is approaching the anchor or not. If this is not the case, the system may e.g., assume that the key device is passing by and then abort the ranging operations.

According to a further embodiment, evaluating the first ranging results is performed individually by each anchor.

In other words, each of the anchors determines autonomously whether it is a member of the subset or not.

According to a further embodiment, evaluating the first ranging results is performed centrally by a controller of the RF access system.

In other words, the decision which anchors are included in the subset of anchors is performed centrally.

According to a further embodiment, the method further comprises at least one of: adding an anchor to the subset if the determined position information indicates that the key device is visible to and/or moving towards said anchor; and removing an anchor from the subset if the determined position information indicates that the key device is not visible to and/or moving away from said anchor.

In other words, anchors may be added or removed depending on the determined position information. In this way, the precision is further improved in that that or those anchors that are best suited to obtain the second ranging results and radar results are also operated accordingly.

According to a further embodiment, one of the anchors fulfils the one or more predetermined conditions when the first ranging result for that anchor has a variance below a predetermined variance threshold value.

In other words, if the variance of the first ranging result is not too high, this is taken as an indication of the anchor being suitable for operating efficiently in the second mode. On the other hand, if the variance is above the variance threshold value, this indicates that there may not be an unobstructed line of sight, multiple transmission paths (refelctions) or a similar situation leading to fluctuating distance estimates.

According to a further embodiment, a group of the anchors fulfil the one or more predetermined conditions when application of a multilateration algorithm to the corresponding first ranging results is successful.

In other words, if application of a multilateration algorithm to the first ranging results of a group of anchors results in an unambiguous localization of the key device, this group of anchors is determined to fulfill the one or more predetermined conditions and thus selected to be included in the subset of anchors.

According to a further embodiment, the first RF ranging operations of the first mode comprise a first plurality of distance measurements.

Each distance measurement of the first plurality of distance measurements may in particular be obtained by performing time of flight measurements. The distance measurements of the first plurality may preferably be performed during a certain (first) period of time. Alternatively, the first plurality of distance measurements may contain a predetermined (first) number of distance measurements.

According to a further embodiment, the second RF ranging operations of the second mode comprise a second plurality of distance measurements and a plurality of angle measurements, and/or the RF radar operations of the second mode comprise at least one of measurements of position, measurements of velocity, and measurements of direction.

Each distance measurement of the second plurality of distance measurements may in particular be obtained by performing time of flight measurements. The distance measurements of the second plurality and/or the angle measurements may preferably be performed during a certain (second) period of time. Alternatively, the second plurality of distance measurements and/or the plurality of angle measurements may contain a predetermined (second) number of distance measurements and/or angle measurements.

According to a further embodiment, determining the position information comprises: identifying at least one of one or more distance estimates and one or more angle estimates from the second ranging results, and one or more position estimates from the radar results that match each other; and determining the position information based on the identified matching distance estimates, angle estimates and position estimates.

In other words, one or more distance estimates and/or one or more angle estimates (from the second ranging results) and one or more position estimates (from the radar results) that match together (in the sense that they all match one position, preferably with some uncertainty) are identified and used to determine the position information.

Thereby, by identifying a subset of matching estimates and relying on this subset for determining the position information, other estimates (e.g., corresponding to multipath reflections) are disregarded, which allows for a quicker and more precise determination of the position information.

According to a further embodiment, the method further comprises operating the plurality of anchors in an initial mode in order to establish communication with the key device via another communication channel prior to operating the anchors in the first mode.

In other words, the initial contact between the anchors and the key device is not established via the RF communication channel that is used for ranging and radar operations, such as a UWB channel, but preferably via another RF communication channel, such as Bluetooth, Wi-Fi, 6G, etc. Thereby, when UWB is used for ranging and radar, the amount of UWB traffic is reduced, as is the corresponding power consumption.

According to a third aspect, there is provided an RF access system, such as a UWB access system. The RF access system comprises at least one anchor arranged at a predetermined location and configured to communicate with one or more key devices; and a controller in communication with the at least one anchor, wherein the at least one anchor and the controller are configured to perform the method according to the first aspect, the second aspect or any of the embodiments described above.

This aspect is essentially based on the same ideas as the first and second aspects discussed above and provides a corresponding RF access system having at least all the advantages in terms of increased precision and reduced traffic and power consumption.

As mentioned above, UWB communication may be a preferred choice. However, other RF communication channels, such as Bluetooth, Wi-Fi, 6G, etc. may also be utilized.

It should be noted that exemplary embodiments have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present disclosure will be apparent from the examples of embodiment to be described hereinafter and are explained with reference to the examples of embodiment. Aspects of the present disclosure will be described in more detail hereinafter with reference to examples of embodiment to which the present disclosure is, however, not limited.

DETAILED DESCRIPTION

Figure 1:
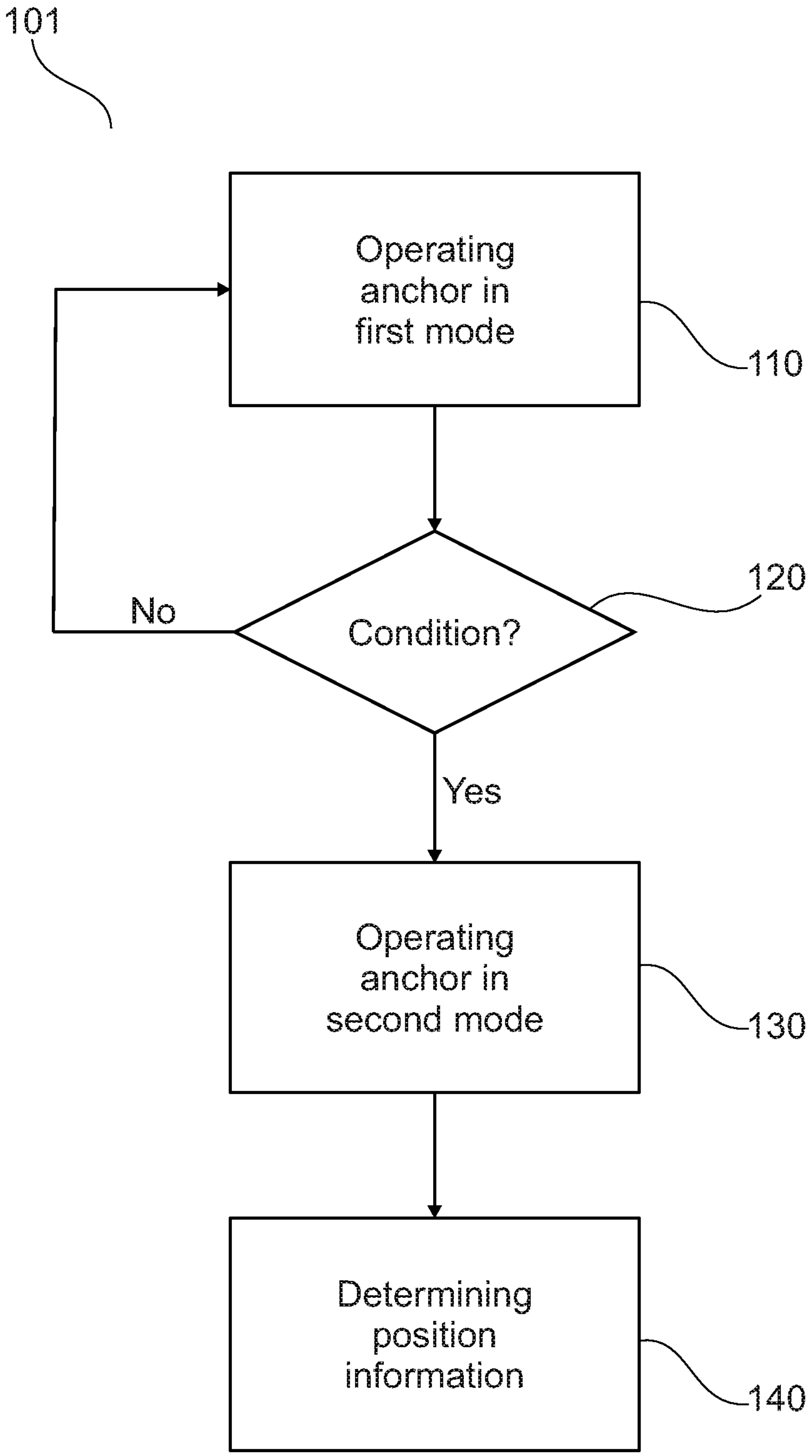
FIG. 1 shows a flowchart of a method of operating an UWB access system in accordance with an exemplary embodiment.

The illustration in the drawing is schematic. It is noted that in different figures, similar or identical elements are provided with the same reference signs or with reference signs, which differ only within the first digit.

Common for all embodiments of the present disclosure, as described in the following, is that they relate to operation of UWB access systems that comprise one or more anchors configured to communicate with one or more key devices, such as a chip card, a fob, a smartphone, or any other suitable device. However, it should be noted that access systems utilizing other RF communication channels than UWB, such as Bluetooth, Wi-Fi, 6G, etc. for ranging and radar operations can be operated in the same way and thus fall within the scope of the present disclosure and claims. Each anchor comprises RF circuitry, in particular transmitter and receiver circuitry, and processing circuitry, in particular a controller circuit or module. The UWB access systems also comprises communication circuitry for communicating with the anchor(s), and control circuitry for controlling the anchors and other modules, such as a lock.

The one or more anchors are arranged at predetermined locations, preferably in or in the immediate vicinity of an access limiting installation, such as a door, a gate, or a vehicle, such as a car, a boat, or an airplane. Dependent on the communication between the anchor(s) and a key device, the UWB access system will decide to unlock the access limiting installation and thereby grant a holder of the key device access to a room, a building, a restricted area, such as a sports venue, another event venue, or a public transportation facility, etc., or to a vehicle, such as in particular a car. The decision to give access is typically based on a determination of whether the authorized key device is within a predefined spatial region or range relative to the UWB access system.

The present disclosure relates to ways of making such a determination in an efficient, reliable, and precise manner, in particular with as little UWB traffic and power consumption as possible. The initial establishment of communication between the key device and the UWB access system, including verification of the key device as being authorized to gain access (in the sense that the key fits the corresponding door or vehicle), is performed via another communication channel, typically a Bluetooth channel, and is as such known in the art and thus not described in detail here.

FIG. 1 shows a flowchart 101 of a method of operating an UWB access system in accordance with an exemplary embodiment. In this embodiment, the UWB access system comprises one anchor that is arranged at a predetermined location, such as a door or a gate, and configured to communicate with one or more key devices.

The method 101 begins at 110 (after contact has been established between a key device and the UWB access system, e.g., via a Bluetooth communication channel, as discussed above) by operating the anchor in a first mode. The first mode comprises first UWB ranging operations for determining a first ranging result for the anchor relative to the key device. The first ranging result preferably comprises a number of distance estimates, i.e., estimates of the distance between anchor and key device. These estimates are obtained by UWB ranging as known in the art, in particular by measuring times of flight during communication between anchor and key device.

Then, at 120, the method 101 continues by determining whether the first ranging result fulfills a predetermined condition. This aims at determining whether the first ranging result is stable and reliable, e.g., whether the distance estimates exhibit low or high variance, the latter being the case if the direct path between key device and anchor is blocked, for example when the key device is carried in the pocket. If it is determined that the variance is low, e.g., below a predetermined variance threshold value, the predetermined condition is not met, and the system continues operating the anchor in the first mode. Otherwise, if the variance is above the predetermined variance threshold value, the predetermined condition is fulfilled, and the method continues to 130.

At 130, the anchor is operated in a second mode. The second mode comprises second UWB ranging operations for determining a second ranging result for the anchor relative to the key device. Like the first ranging result, the second ranging result preferably also comprises a number of distance estimates. Additionally, the second ranging result may comprise a number of angle estimates, i.e., estimates indicating an angle between the anchor and the key device. Furthermore, and different from the first mode, the second mode comprises UWB radar operations for determining a radar result for the anchor relative to the holder of the key device, in particular as a number of radar-based position estimates for the holder. Thus, in addition to the UWB ranging operations, which provide estimates for the distance between the key device and anchor based on time of flight measurements, the anchor transmits radar signals and receives corresponding reflections from the holder of the key device, and thereby has an additional source of information relating to the location of the key device as this is carried by the holder, e.g. in a pocket, a bag, or directly in the hand.

Finally, at 140, this information, i.e., the second ranging result and the radar result, which are both obtained utilizing UWB operations in the second mode, is used to determine position information associated with the key device. This position information then allows the UWB access system to determine whether the key device is within a predetermined region where access is to be granted or outside of said region. In the latter case, the operation in the second mode continues. To determine the position information, matching parts of the second ranging result (e.g., distance estimates and/or angle estimates) and the radar result (e.g., position estimates) are identified and used to determine the position information. In other words, distance estimates and/or angle estimates as well as position estimates that all match each other, e.g., correspond to similar positions within certain tolerances, are identified among the available estimates, and (only) the identified matching estimates are used to determine the position information. The position information preferably comprises at least one parameter value selected from the group consisting of absolute position, relative position, velocity of movement, and direction of movement.

In this way, by adding radar operations, the UWB access system is capable of determining precise and reliable position information in cases where ranging operations alone do not provide sufficiently precise information.

Figure 2:
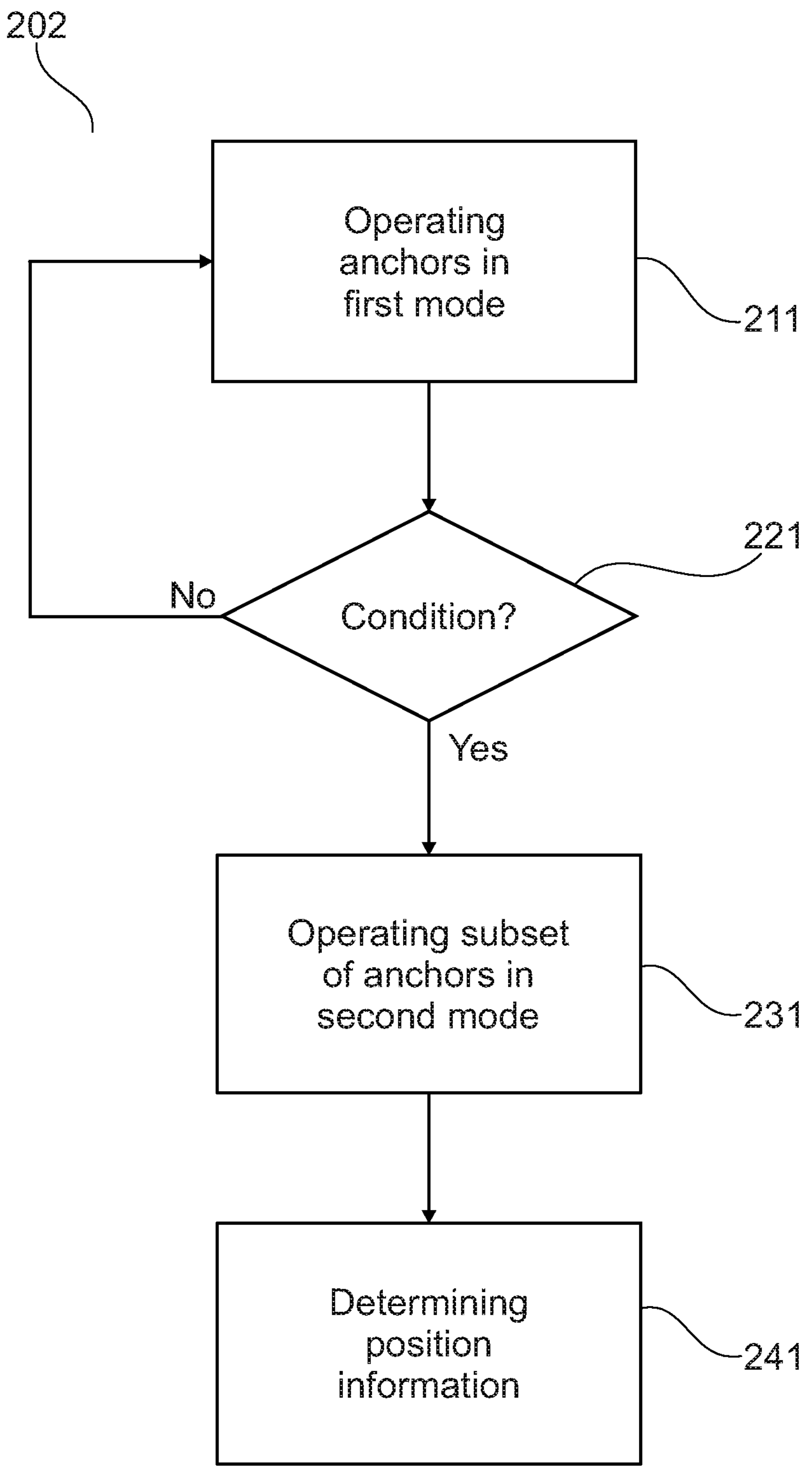
FIG. 2 shows a flowchart of a method of operating an UWB access system in accordance with an exemplary embodiment.

FIG. 2 shows a flowchart 202 of a method of operating an UWB access system in accordance with another exemplary embodiment. In this embodiment, the UWB access system comprises a plurality of anchors. Each anchor is arranged at a respective predetermined location, such as one of four corners of a vehicle, and configured to communicate with one or more key devices, such as a key fob.

The method 202 begins at 211 (after contact has been established between a key device and the UWB access system, e.g., via a Bluetooth communication channel, as discussed above) by operating each anchor in a first mode. The first mode comprises first UWB ranging operations for determining a respective first ranging result for each anchor relative to the key device. Each of the first ranging results preferably comprises a number of distance estimates, i.e., estimates of the distance between the respective anchor and key device. These estimates are obtained by UWB ranging as known in the art, in particular by measuring times of flight during communication between anchor and key device.

Then, at 221, the method 202 continues by evaluating the first ranging results to determine a subset of anchors for which the respective first ranging result fulfills one or more predetermined conditions. This aims at determining a subset of anchors that are capable of obtaining first ranging results that are stable and reliable, e.g., first ranging results with distance estimates that exhibit low variance, which would be the case when a direct path is available between the respective anchor and the key device. Thus, if it is determined that the variance is low, e.g., below a predetermined variance threshold value, the predetermined condition is met, and the given anchor is added to the subset. Otherwise, if the variance is above the predetermined variance threshold value, the given anchor is not added to the subset. The anchors that are not determined to be members of the subset are preferably switched to operating in a standby mode. The evaluation of the first ranging results may be performed individually be each anchor (autonomous evaluation) or it may be performed by the controller of the UWB access system (centralized evaluation).

Then, at 231, the one or more anchors in the subset are operated in a second mode. The second mode comprises second UWB ranging operations for determining a second ranging result for the respective anchor relative to the key device. Like the first ranging results, the second ranging results preferably also comprises a number of distance estimates. Additionally, the second ranging results may comprise a number of angle estimates, i.e., estimates indicating an angle between the respective anchor and the key device. Furthermore, and different from the first mode, the second mode comprises UWB radar operations for determining a radar result for the respective anchor relative to the holder of the key device, in particular as a number of radar-based position estimates for the holder. Thus, in addition to the second UWB ranging operations, which provide estimates for the distance between the key device and the respective anchor in the subset based on time of flight measurements, each anchor transmits radar signals and receives corresponding reflections from the holder of the key device, and thereby has an additional source of information relating to the location of the key device as this is carried by the holder, e.g. in a pocket, a bag, or directly in the hand.

Finally, at 241, this information, i.e., the second ranging results and the radar results of the anchors in the subset, which are both obtained utilizing UWB operations in the second mode, is used to determine position information associated with the key device. This position information then allows the UWB access system to determine whether the key device is within a predetermined region where access is to be granted or outside of said region. In the latter case, the operation in the second mode continues. Furthermore, the UWB access system may determine that the key device is moving in a direction where it would be advantageous to add an anchor that is currently not in the subset to the subset, because the key device is moving towards that anchor. Similarly, it may be advantageous to remove an anchor from the subset if the key device is moving away from that anchor and can be expected to be out of sight soon. Furthermore, it may be determined that the key device is not approaching the access system but rather appears to be passing by. In that case, the access system may abort the localization operations and switch into a standby mode.

To determine the position information, matching parts of the second ranging results (e.g., distance estimates and/or angle estimates) and the radar results (e.g., position estimates) are identified and used to determine the position information. In other words, distance estimates and/or angle estimates as well as position estimates that all match each other, e.g., correspond to similar positions within certain tolerances, are identified among the available estimates, and (only) the identified matching estimates are used to determine the position information. The position information preferably comprises at least one parameter value selected from the group consisting of absolute position, relative position, velocity of movement, and direction of movement.

In this way, by adding UWB radar operations to the one ore more anchors (in the subset) that appear to have the best ranging results when operating in the first mode and deactivating/idling the remaining anchors, the localization of the key device is optimized, and overall UWB traffic (and corresponding power consumption) is significantly reduced.

Figure 3:
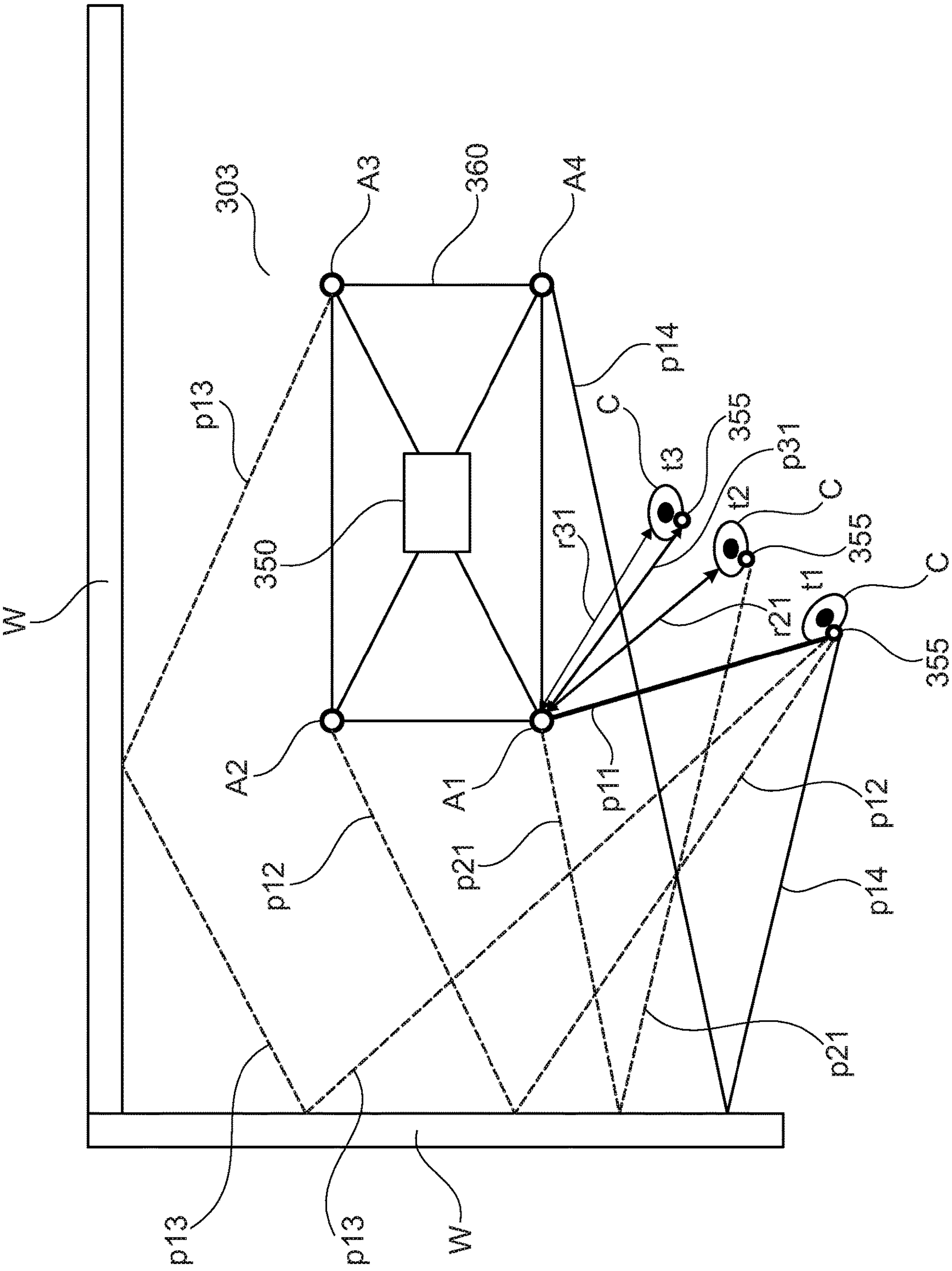
FIG. 3 shows an illustration of an UWB access system according to an exemplary embodiment.

FIG. 3 shows an illustration of an UWB access system 303 according to an exemplary embodiment during operation in accordance with the embodiment of FIG. 2 as discussed above. The UWB access system 303 comprises four anchors A1, A2, A3, A4 arranged at the corners of a car 360 and connected to a controller 350. The car 360 is parked in the vicinity of two walls W. To illustrate the operation of the system, a person C carrying a key fob 355 is shown at three different positions corresponding to three different points in time t1, t2, t3. In the first situation at t1, anchors A1, A2, A3, A4 are operating in the first mode (communication with the key fob 355 has already been established via Bluetooth as discussed above) and thus performing first ranging operations. At this stage, the key fob 355 (which is located in the back pocket of the holder C) has a direct (non-obstructed) path p11 to anchor A1, and indirect paths (involving reflections from the walls W) p12, p13, p14 to anchors A2, A3, A4, respectively. Due to the excellent communication via path p11, anchor A1 is switched to the second mode and thus add UWB radar operations. The remaining anchors A2, A3, A4 are switched into a standby mode and thus aborts the UWB ranging operations. Then, in the situation at t2, there is no longer a direct path but only an indirect path p21 between the fob 355 and the anchor A1, but a radar result is obtained along path r21. This radar result provides position information. Finally, in the situation at t3, there is again a direct path p31 between the fob 355 and the anchor A1, as well as a radar path r31. As can be seen, the UWB access system is capable of keeping good track of the key fob 355 utilizing only one of the four anchors A1, A2, A3, A4, i.e., with a significant reduction in UWB ranging traffic and thus in power consumption.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also, elements described in association with different embodiments may be combined. It should also be noted that reference signs in the claims should not be construed as limiting the scope of the claims.

What is claimed is:

1. A method of operating an RF access system, the system comprising a plurality of anchors, each anchor arranged at a respective predetermined location and configured to communicate with one or more key devices, the method comprising:
- operating each anchor in a first mode, the first mode comprising first RF ranging operations for determining a first ranging result for the anchor relative to a key device;
- determining first ranging results from the plurality of anchors to determine a subset of the anchors that fulfil one or more predetermined conditions;
- selecting an anchor of the subset of anchors based on one or more signal parameters;
- placing other anchors of the subset into a standby mode;
- operating the selected anchor in a second mode, the second mode comprising second RF ranging operations for determining a second ranging result for the selected anchor relative to the key device, and RF radar operations for determining a radar result for the selected anchor relative to a holder of the key device based on radar signals reflected by the holder; and
- determining position information associated with the key device based on the second ranging result and the radar result.

2. The method according to claim 1, further comprising at least one of:
- wherein the first ranging result comprises a first plurality of distance estimates, each distance estimate being indicative of an estimated distance between the anchor and the key device, and
- wherein the second ranging result comprises a second plurality of distance estimates, each distance estimate being indicative of an estimated distance between the selected anchor and the key device.

3. The method according to claim 2, wherein the radar result comprises a plurality of position estimates indicative of a position of the holder of the key device relative to the anchor.

4. The method according to claim 2, wherein determining the position information comprises:
- identifying at least one of one or more distance estimates and one or more angle estimates from the second ranging result that match position estimates of the radar result; and
- determining the position information based on the identified matching distance estimates, angle estimates and position estimates.

5. The method according to claim 2, wherein at least one of the one or more predetermined conditions is fulfilled when the distance estimates of the first ranging result comprise a variance exceeding a predetermined variance threshold value, and/or wherein the second ranging result further comprises a plurality of angle estimates, each angle estimate being indicative of an angle between the anchor and the key device.

6. The method according to claim 1, wherein the radar result comprises a plurality of position estimates indicative of a position of the holder of the key device relative to the selected anchor.

7. The method according to claim 1, wherein determining the position information comprises:
- identifying at least one of one or more distance estimates and one or more angle estimates from the second ranging result that match position estimates of the radar result; and
- determining the position information based on the identified matching distance estimates, angle estimates, and position estimates.

8. A method of operating an RF access system, the system comprising a plurality of anchors, each anchor being arranged at a respective predetermined location and configured to communicate with one or more key devices, the method comprising:
- operating each of the anchors in a first mode, the first mode comprising first RF ranging operations for determining a respective first ranging result for each anchor relative to a key device;
- evaluating the first ranging results to determine a subset of the anchors that fulfil one or more predetermined conditions;
- selecting an anchor of the subset of anchors based on one or more signal parameters;
- placing other anchors of the subset into a standby mode;
- operating the selected anchor in a second mode, the second mode comprising second RF ranging operations for determining a second ranging result for the selected anchor relative to the key device, and RF radar operations for determining a radar result for the selected anchor relative to a holder of the key device based on signals reflected by the holder; and
- determining position information associated with the key device based on the second ranging result and the radar result.

9. The method according to claim 8, wherein the position information comprises at least one parameter value selected from the group consisting of absolute position, relative position, velocity of movement, and direction of movement.

10. The method according to claim 8, wherein evaluating the first ranging results is performed individually by each anchor, or wherein evaluating the first ranging results is performed centrally by a controller of the RF access system.

11. The method according to claim 8, further comprising at least one of:

adding an anchor to the subset if the determined position information indicates that the key device is visible to and/or moving towards said anchor; and removing an anchor from the subset if the determined position information indicates that the key device is not visible to and/or moving away from said anchor.

12. The method according to claim 8, further comprising at least one of:

wherein one of the anchors fulfils the one or more predetermined conditions when the first ranging result for that anchor has a variance below a predetermined variance threshold value, and wherein a group of the anchors fulfil the one or more predetermined conditions when application of a multilateration algorithm to the corresponding first ranging results is successful.

13. The method according to claim 8, further comprising at least one of:

wherein the first RF ranging operations of the first mode comprise a first plurality of distance measurements, wherein the second RF ranging operations of the second mode comprise a second plurality of distance measurements and a plurality of angle measurements, and wherein the RF radar operations of the second mode comprise at least one of measurements of position, measurements of velocity, and measurements of direction.

14. The method according to claim 8, wherein determining the position information comprises:

identifying at least one of one or more distance estimates and one or more angle estimates from the second ranging results that match position estimates of the radar result; and determining the position information based on the identified matching distance estimates, angle estimates, and position estimates.

15. The method according to claim 8, further comprising operating the anchor or respectively the plurality of anchors in an initial mode in order to establish communication with the key device via another RF communication channel prior to operating anchor or respectively the anchors in the first mode.

16. The method according to claim 8, wherein the position information comprises at least one parameter value selected from the group consisting of absolute position, relative position, velocity of movement, and direction of movement.

17. The method according to claim 8, wherein evaluating the first ranging results is performed individually by each anchor, or wherein evaluating the first ranging results is performed centrally by a controller of the RF access system.

18. The method according to claim 8, further comprising at least one of:

adding an anchor to the subset if the determined position information indicates that the key device is visible to and/or moving towards said anchor; and removing an anchor from the subset if the determined position information indicates that the key device is not visible to and/or moving away from said anchor.

19. A radio frequency (RF) access system comprising:

a plurality of anchors, each anchor arranged at a respective predetermined location and configured to communicate with one or more key devices; and a controller in communication with the plurality of anchors and configured to:

operate each anchor in a first mode, the first mode comprising first RF ranging operations for determining a first ranging result for the anchor relative to a key device;

determine first ranging results from the plurality of anchors to determine a subset of the anchors that fulfil one or more predetermined conditions;

selecting an anchor of the subset of anchors based on one or more signal parameters;

operate the selected anchor in a second mode, the second mode comprising second RF ranging operations for determining a second ranging result for the selected anchor relative to the key device, and RF radar operations for determining a radar result for the selected anchor relative to a holder of the key device based on radar signals reflected by the holder; and determine position information associated with the key device based on the second ranging result and the radar result.

* * * * *